United States Patent
Gao et al.

(10) Patent No.: US 12,022,825 B1
(45) Date of Patent: Jul. 2, 2024

(54) PREPARATION METHOD FOR MODIFIED NANO-ZINC OXIDE POWDER

(71) Applicant: Hongye Gao, Guangdong (CN)

(72) Inventors: Hongye Gao, Guangdong (CN); Weihao Tang, Guangdong (CN)

(73) Assignee: Hongye Gao, Guangdong (CN)

( * ) Notice: Subject to any disclaimer, the term of this patent is extended or adjusted under 35 U.S.C. 154(b) by 0 days.

(21) Appl. No.: 18/384,042

(22) Filed: Oct. 26, 2023

(51) Int. Cl.
 *A01N 25/12* (2006.01)
 *A01N 59/16* (2006.01)
 *A01P 1/00* (2006.01)
 *B01J 2/16* (2006.01)

(52) U.S. Cl.
 CPC ............. *A01N 25/12* (2013.01); *A01N 59/16* (2013.01); *A01P 1/00* (2021.08); *B01J 2/16* (2013.01)

(58) Field of Classification Search
 CPC ................................ A01N 59/16; A01N 25/12
 See application file for complete search history.

(56) References Cited

FOREIGN PATENT DOCUMENTS

CN         113549343 B   *   5/2022

OTHER PUBLICATIONS

ASTM International; Designation E2149-13a; "Standard Test Method for Determining the Antimicrobial Activity of Antimicrobial Agents Under Dynamic contact Conditions"; 5 Pgs.
ASTM; Designation G 154-00a; "Standard Practice for Operating Fluorescent Light Apparatus for UV Exposure of Nonmetallic Materials"; Aug. 2001; 9 Pgs.
Liu Lirong, et al.; "National Standards of the People's Republic of China"; "Determination of the tensile properties of the plastics auxiliary word for ordinal numbers; part 1: general rules"; Dec. 28, 2018; 37 Pgs.

* cited by examiner

*Primary Examiner* — Kyle A Purdy
(74) *Attorney, Agent, or Firm* — Cooper Legal Group, LLC

(57) ABSTRACT

A preparation method for a modified nano-zinc oxide powder includes the following steps: step 1) immersing a raw material zinc oxide into a first active liquid, filtering and drying to obtain an activated zinc oxide; step 2) crushing the activated zinc oxide by an airflow crushing to obtain a crushed zinc oxide; step 3) immersing the crushed zinc oxide into the second active liquid, filtering, drying and grinding to obtain an activated nano-zinc oxide; and step 4) mixing the activated nano-zinc oxide and a surface modifier in a weight ratio of 1:(0.8-1.5) uniformly, drying and grinding to obtain a modified nano-zinc oxide powder with a particle size of 10-90 nm.

9 Claims, 1 Drawing Sheet

PREPARATION METHOD FOR MODIFIED NANO-ZINC OXIDE POWDER

CROSS-REFERENCE TO RELATED APPLICATION

The present application is based on and claims the priority benefits of China application No. 202311164837.5, filed on Sep. 9, 2023. The entirety of China application No. 202311164837.5 is hereby incorporated by reference herein and made a part of this specification.

TECHNICAL FIELD

The present application relates to the technical field of environment-friendly material, and particularly to a preparation method for a modified nano-zinc oxide powder.

BACKGROUND ART

Zinc oxide is an oxide of zinc, and has a large bandgap and exciton binding energy, high transparency, and excellent room temperature luminescence performance. Zinc oxide is applied in liquid crystal display, thin film transistor and light-emitting diodes and other products in semiconductor field. However, the zinc oxide with a large particle size has poor dispersibility and limited application, so the zinc oxide with a nanoscale particle size is mainly researched currently.

Nano-zinc oxide has extremely high chemical activity and excellent catalytic activity and photocatalytic activity, and also has resistance to infrared and ultraviolet radiation and sterilization function. Therefore, nano-zinc oxide is widely applied in many fields such as chemical coatings, ceramics, electronics, food packaging, optics, and biomedicine.

When the nano-zinc oxide is used to produce the food packaging, for example, being filled into materials such as polyhydroxyalkanoate (PHA), polyethylene (PE), polypropylene (PP), polyvinyl chloride (PVC), polycarbonate (PC) and other like to product packaging film or packaging bottle, the packaging materials have good antibacterial property due to addition of the nano-zinc oxide.

However, the nano-zinc oxide has large specific surface area and specific surface energy, so the nano-zinc oxide is prone to self-agglomeration during a filling process, as a result, the nano-zinc oxide is prone to be dispersed non-uniformly in the polymeric materials, thereby affecting the physical property of the food packaging film. Further, the nano-zinc oxide has a strong surface polarity, so it has a poor compatibility with polymers, thereby affecting the physical property of the food packaging film, and further limiting the application of the nano-zinc oxide.

In order to improve the compatibility of the nano-zinc oxide, the nano-zinc oxide is generally surface-modified by the surface modifier. The common surface modifier includes silane coupling agent, titanate coupling agent, acrylic ester polymer and epoxy resin. After the nano-zinc oxide is surface-modified by the above materials, the compatibility of the nano-zinc oxide can be improved, but the above materials have a little toxicity or are not environmentally friendly.

In addition, the nano-zinc oxide is generally produced through precipitation method, sol-gel method, microemulsion method and hydrothermal method, etc., and needs to be directly mixed with the above surface modifiers, or mixed with a diluted solution of the above surface modifier. The above preparation processes of the nano-zinc oxide are complex and are difficult to be controlled in purity of products, and the nano-zinc oxide is prone to self-agglomeration during being mixed with the surface modifiers. Therefore, the nano-zinc oxide needs to be improved and further researched.

SUMMARY

In order to solve the above technical problem, the present application provides a preparation method for a modified nano-zinc oxide powder.

In a first aspect, the present application provides a preparation method for a modified nano-zinc oxide powder, including the following steps:

step 1) weighting and mixing 15-30 parts of anhydrous ethanol, 0.5-3 parts of betaine and 10-20 parts of water uniformly, calculated in parts by weight, to obtain a first active liquid; immersing a raw material zinc oxide into the first active liquid, filtering and drying to obtain an activated zinc oxide;

step 2) crushing the activated zinc oxide by an airflow crushing to obtain a crushed zinc oxide;

step 3) weighting and mixing 10-20 parts of anhydrous ethanol, 0.01-0.05 parts of dodecylphenol polyoxyethylene ether and 10-30 parts of water uniformly, calculated in parts by weight, adding 2-hydroxysuccinic acid to adjust pH to 5-6 to obtain a second active liquid; immersing the crushed zinc oxide into the second active liquid, filtering, drying and grinding to obtain an activated nano-zinc oxide; and step 4) mixing the activated nano-zinc oxide and a surface modifier in a weight ratio of 1:(0.8-1.5) uniformly, drying and grinding to obtain the modified nano-zinc oxide powder with a particle size of 10-90 nm.

The above preparation method is simple, in which the zinc oxide can be produced under low temperature, thereby increasing the processing efficiency. In step 1), the adhered substances, impurities and other substances on the surface of the zinc oxide are removed after the zinc oxide is immersed in the first active liquid, thereby increasing its purity, reducing the agglomeration of the zinc oxide during the airflow crushing, and further facilitating the airflow crushing.

In step 2), the activated zinc oxide particles can be collided and crushed by the airflow crushing to obtain the crushed zinc oxide. In step 3), agglomeration of the crushed zinc oxide can be reduced after being processed by the second active liquid, while the impurities are removed further to increase its purity. In step 4), the activated nano-zinc oxide is surface modified and wrapped by the surface modifier, so that the specific surface energy and the polarity of nano-zinc oxide are decreased, and the obtained modified nano-zinc oxide powder is easily compatible with the polymer.

In summary, in the present application, the zinc oxide, as a base material, is processed by the first active liquid, the airflow crushing, the second active liquid and the surface modifier successively, such that the obtained modified nano-zinc oxide powder has a good compatibility, and is not easy to self-agglomerate, and further easy to be compatible with the polymer. When the obtained modified nano-zinc oxide powder is used in packaging material, it has good filling effect and compatibility, thereby enhancing the ultraviolet resistance, antibacterial property, and mechanical property of the products.

The anhydrous ethanol has effects of bactericidal and disinfection, and also can clean impurities on the surface of items as a cleaner. Since the zinc oxide is generally prepared through high-temperature calcination of zinc carbonate or precipitation method, the prepared zinc oxide may carry some impurities or dust during transportation, packaging or processing, which affects its purity. Betaine is tetradecyldimethylbetaine, as an amphoteric surfactant, also has bactericidal, cleaning, and other effects. Therefore, the first active liquid, as a combination of the anhydrous ethanol, water and tetradecyldimethylbetaine, may impart activity to the zinc oxide and remove the impurities. After the zinc oxide is immersed in the first active liquid, all the glycol on the surface of the zinc oxide will be volatilized, and a small amount of the tetradecyldimethylbetaine is adhered on the surface of the zinc oxide, thereby increasing the surface activity of the zinc oxide, reducing the agglomeration, increasing an efficiency of the airflow crushing, and further improving the processing efficiency.

The dodecylphenol polyoxyethylene ether is a surfactant with a Hydrophile-Lipophile Balance value (HLB value) of 14.5, and has good dispersivity. The second active liquid is obtained by mixing the anhydrous ethanol, water, dodecylphenol polyoxyethylene ether and 2-hydroxysuccinic acid, and is able to increase its activity, reduce self-agglomeration, and further increase the dispersivity of the activated nano-zinc oxide and the surfactant. Therefore, the obtained modified nano-zinc oxide powder is easy to be compatible with polymers and difficult for self-agglomeration. The antibacterial property, ultraviolet resistance and physical property of the obtained modified nano-zinc oxide powder can be improved when it is applied in food packaging materials.

In an embodiment, the crushed zinc oxide has a particle size of 1-10 μm. In an embodiment, the activated nano-zinc oxide has a particle size of 5-50 nm. In an embodiment, the raw material zinc oxide has a particle size of 0.1-1 mm. The above particle sizes are preferable in the present application.

In the present application, a test method for nanoparticle size is as follows. After grinding the materials in a grinding machine for a period of time, a small amount of zinc oxide is taken out of the grinding machine to observe its particle size via an electron microscope. When the particle size is observed to be within a range of 10-90 nm, grinding is stopped, thereby obtaining the modified nano-zinc oxide powder.

According to the same method, when the activated nano-zinc oxide with a particle size of 5-50 nm is to be obtained, a small amount of activated nano-zinc oxide is taken out and observed via the electron microscope during the grinding process. When the particle size is observed to be within a range of 5-50 nm, the grinding is stopped, thereby obtaining the activated nano-zinc oxide.

In an embodiment, a specific process of step 2) is as follows: successively feeding, extruding, adding pressure to the activated zinc oxide, injecting air to break agglomeration via the airflow crushing to obtain powders, screening the powders to obtain qualified powders and unqualified powders, collecting the qualified powders, and performing the airflow crushing to the unqualified powders under a work pressure of 0.98-1.02 MPa and an air demand of 2-4 m$^3$/min to obtain the crushed zinc oxide.

In the above technical solution, the zinc oxide is fed and then extruded. During the extruding process, the extruded zinc oxide is quickly moved under the action of the quickly moved airflow. The particles of the zinc oxide are collided with each other to be split under pressure during flowing, so that finer zinc oxide powders are formed after multiple collisions and splits, and further screened to collect zinc oxide powder within a proper particle size range, thereby obtaining the crushed zinc oxide. However, the unqualified zinc oxide powders are subjected to the airflow crushing again. During this process, the zinc oxide can be collided and split under airflow and air pressure, the formed powders can be further screened to obtain the zinc oxide powder with uniform particle size to be collected. A cloth bag is used for collecting, which can reduce dust flying and a possibility of polluting the environment of workshops.

The zinc oxide can be crushed under low temperature through the above technical solution. Polyhedral crushed zinc oxide formed after being crushed has good ultraviolet resistance and antibacterial property. The activated nano-zinc oxide processed by the second active liquid is easy to be surface modified and wrapped by the surface modifier, thereby further improving the compatibility of the modified nano-zinc oxide powder with polymers, and enhancing the practicality of the modified nano-zinc oxide powder. Moreover, the modified nano-zinc oxide powder has a good filling effect in the food packaging materials, so that the products have good antibacterial property, ultraviolet resistance and mechanical property.

In an embodiment, an airflow crushing equipment is used in step 2), and the airflow crushing equipment includes a feeding system, an airflow crushing grading machine and a bag collector, arranged in sequence, in accordance with a processing process; the airflow crushing equipment further includes a material controller; and the feeding system, the airflow crushing grading machine and the bag collector are electrically connected to the material controller.

In an embodiment, the bag collector has a filtering area of 8-12 m$^2$, and a filtering bag in the bag collector is a polyester fiber filtering cartridge. The airflow crushing grading machine includes an airflow crushing mechanism and a grading mechanism, the airflow crushing mechanism includes an induced draft fan, and the induced draft fan has a preferred power of 1.8-2.4 KW and the grading mechanism has a preferred power of 0.98-1.3 KW.

The airflow crushing grading machine adopts an integrated structure of crushing and grading, and the crushing and grading of the processing process are completed at the same time, thereby increasing the productivity. The implementation principle of the airflow crushing process is that, the zinc oxide is cooled, filtered and dried through compressed air, and injected into a crushing chamber by a supersonic airflow formed from a Laval nozzle of the airflow crushing grading machine, then the zinc oxide is in a flowing state. The zinc oxide converges at an intersection of the Laval nozzles under an accelerating force, and is collided, rubbed and sheared to form superfine particles during a converging process.

The airflow crushing is a media-free crushing, so the obtained zinc oxide has a high purity. In addition, the airflow crushing process does not need heating or solvents for processing, so that the zinc oxide can be processed under room temperature to obtain a micron-level zinc oxide.

The crushed zinc oxide can be screened according to particles through the grading mechanism of the airflow crushing grading machine, thereby facilitating selecting the zinc oxide with different particle sizes. The implementation principle of the grading mechanism is that, the crushed zinc oxide rises to a turbine grading area of the grading mechanism under the action of the airflow, the crushed zinc oxide is subjected to both centrifugal force and airflow viscosity under the rotation of a grading turbine of the grading mechanism, thereby generating a centripetal force. When the centrifugal force subjected by the crushed zinc oxide is greater than the centripetal force, coarse particles with a particle size that is greater than the grading diameter spiral down a barrel wall of the grading mechanism to a crushing area of the airflow crushing mechanism for being crushed again, and the zinc oxide with a qualified particle size enter into the bag collector with the airflow via the turbine for collection. The above screening can further improve the particle uniformity of the crushed zinc oxide, thereby facilitating subsequent processing and processing with the surface modifier.

In addition, the bag collector can reduce influence of the environment of workshop due to flying of nano-zinc oxide dust, thereby improving the environmental friendliness of production.

In an embodiment, the surface modifier is made of the following raw materials in parts by weight:
- 0.1-0.3 parts of polylysine-PEG copolymer;
- 10-20 parts of polyethylene glycol solution;
- 10-22 parts of organic acid solution;
- 1-3 parts of mussel adhesive protein solution;
- 1-3 parts of xanthan gum solution;
- 0.01-0.05 parts of ammonium persulfate; and
- 2-5 parts of chitosan.

In an embodiment, a preparation method for the surface modifier includes the following steps:
- step (1) weighting the chitosan and dissolving the chitosan in the organic acid solution, heating to 65-85° C., and stirring for 1-3 h to obtain a mixture A;
- step (2) weighting the ammonium persulfate, adding the ammonium persulfate into the mixture A under uniformly stirring, adding the polyethylene glycol solution, and stirring for 1-3 h to obtain a mixture B; and
- step (3) weighting the xanthan gum solution, the mussel adhesive protein solution and the polylysine-PEG copolymer, adding the xanthan gum solution, the mussel adhesive protein solution and the polylysine-PEG copolymer into the mixture B, stirring for 0.5-1 h, and adjusting pH to 4.5-5.5 to obtain the surface modifier.

The components and usage of the above materials are preferable ranges. In particular, the chitosan has antibacterial property and ultraviolet resistance, and has amino group and carboxyl group. The organic acid solution has hydroxyl group and carboxyl group, therefore, the chitosan is easy to be dissolved in the organic acid solution and are mixed with the organic acid to obtain the mixture A.

The polyethylene glycol solution has a mass fraction of 5-10%. The polyethylene glycol, having hydroxyl groups, is mixed with the mixture A to obtain the mixture B. Since the polyethylene glycol has good adhesion, so that the obtained mixture B also has good adhesion after mixing.

The xanthan gum solution is obtained by dissolving 5-10 parts of the xanthan gum into 50 parts of deionized water. The xanthan gum solution has good adhesion and film-forming property, thereby further improving the film-forming property and adhesion of the surface modifier.

The mussel adhesive protein solution is obtained by dissolving 10-20 parts of the mussel adhesive protein solution into 50 parts of water. Mussel adhesive protein is extracted from the byssus gland of the marine mussel and has a strong ability to adhere to the substrate. After the mussel adhesive protein is mixed with the mixture B, the prepared surface modifier has good adhesion, antibacterial property, and ultraviolet resistance, so that a strong adhesion effect on the surface of nano-zinc oxide is obtained.

The polylysine-PEG copolymer has good film-forming property and adhesion, and has a synergistic effect with the mussel adhesive protein solution, the xanthan gum solution and the mixture B, thereby enhancing the adhesion effect of the surface modifier on the surface of the nano-zinc oxide and forming a wrapping membrane that has a stable adhesion.

In summary, after the organic acid, the chitosan, and the polyethylene glycol are mixed with each other, the obtained mixture A has antibacterial property, oxidize resistance, adhesion, and film-forming property. After the mixture A is mixed with the mussel adhesive protein solution, the polylysine-PEG copolymer and the xanthan gum solution, a synergistic film-forming property and adhesion effect are obtained, thereby further improving the modifying effect of the formed surface modifier on the nano-zinc oxide, forming a wrapping membrane on its surface, and further improving the compatibility of the modified nano-zinc oxide powder with the polymer. Meanwhile, the modified nano-zinc oxide powder also has better antibacterial and UV resistance when it is used in the substrate.

In the present application, the surface modifier, obtained by mixing the organic acid, the chitosan, the polyethylene glycol, the mussel adhesive protein solution, the polylysine-PEG copolymer and the xanthan gum solution, has good environmental performance, and modifying and wrapping effect, so that the modified nano-zinc oxide powder has better compatibility with the polymer. Meanwhile the wrapping membrane formed by the surface modifier has a synergistic effect with the nano-zinc oxide, thereby further enhancing the antibacterial property and ultraviolet resistance of the modified nano-zinc oxide powder. The obtained modified nano-zinc oxide powder has good antibacterial property, ultraviolet resistance and physical property when it is applied in food packaging materials.

In an embodiment, the organic acid solution includes citric acid, tartaric acid, salicylic acid and water.

In an embodiment, the citric acid, the tartaric acid, the salicylic acid and water are in a weight ratio of (0.5-0.8):(0.2-0.5):(0.1-0.3):10.

The citric acid, the tartaric acid and the salicylic acid all have hydroxyl group and carboxyl group, and can be mixed with the chitosan. The mixture A containing organic acid-chitosan complex is further mixed with the polyethylene glycol solution, so that the obtained mixture B has good adhesion. The mixture B is further mixed with the xanthan gum solution, the mussel adhesive protein solution and the polylysine-PEG copolymer, so that the prepared surface modifier has good film-forming property, adhesion, antibacterial property and ultraviolet resistance. When mixing with the surface modifier, a wrapping membrane is formed, so that the prepared modified nano-zinc oxide powder has good compatibility, antibacterial property and ultraviolet resistance. When they are applied in food packaging, the antibacterial property and ultraviolet resistance of the package bag can be improved.

In a second aspect, the present application provides a modified nano-zinc oxide powder, the modified nano-zinc oxide powder has a particle size of 10-90 nm, which is prepared by the preparation method for the modified nano-zinc oxide powder described above.

The modified nano-zinc oxide powder with a particle size of 10-90 nm is easy to be compatible with the polymers, and the obtained products have good antibacterial property and ultraviolet resistance.

In a third aspect, the present application provides an application of the modified nano-zinc oxide powder, and the modified nano-zinc oxide powder is applied in a food packaging and a proportion of the modified nano zinc oxide powder in the food packaging is 1-20%.

The modified nano-zinc oxide powder with above usage range can be uniformly mixed with a material system of the food packaging product, thereby further improving the resistance to oxidation and the antibacterial property.

In summary, the present application can achieve at least one of the following beneficial effects:
1. in the present application, the zinc oxide, as a base material, is processed by the first active liquid, the airflow crushing, the second active liquid and the surface modifier, successively, such that the obtained modified nano-zinc oxide powder has a good compatibility, and is not easy to self-agglomerate, and further easy to be composite with the polymer, thereby enhancing the practicality. When the zinc oxide is applied in the package material, it has good filling effect, thereby enhancing the ultraviolet resistance, antibacterial properties, and mechanical properties of the product.
2. The zinc oxide is fed, extruded, added pressure, and performed the airflow crushing after injecting air to obtain powders. The powders are screened to obtain qualified powders and unqualified powders, the qualified powders are collected, the unqualified powders are performed the airflow crushing again for being crushed. The crushed zinc oxide can be produced at room temperature due to a series of operations described above, thereby improving the processing efficiency and purity of the products.
3. After the organic acid, the chitosan, and the polyethylene glycol are mixed with each other, the obtained mixture A has antibacterial property, oxidize resistance, adhesion, and film-forming property. After the mixture A is mixed with the mussel adhesive protein solution, the polylysine-PEG copolymer and the xanthan gum solution, a synergistic film-forming property and adhesion effect are obtained, thereby further improving the modifying effect of the formed surface modifier on the nano-zinc oxide, forming a wrapping membrane on its surface, and further improving the compatibility of the modified nano-zinc oxide powder with the polymer. Meanwhile, the modified nano-zinc oxide powder also has better antibacterial and UV resistance and good mechanical property when it is used in the food packaging materials.

DETAILED DESCRIPTION

Figure 1:
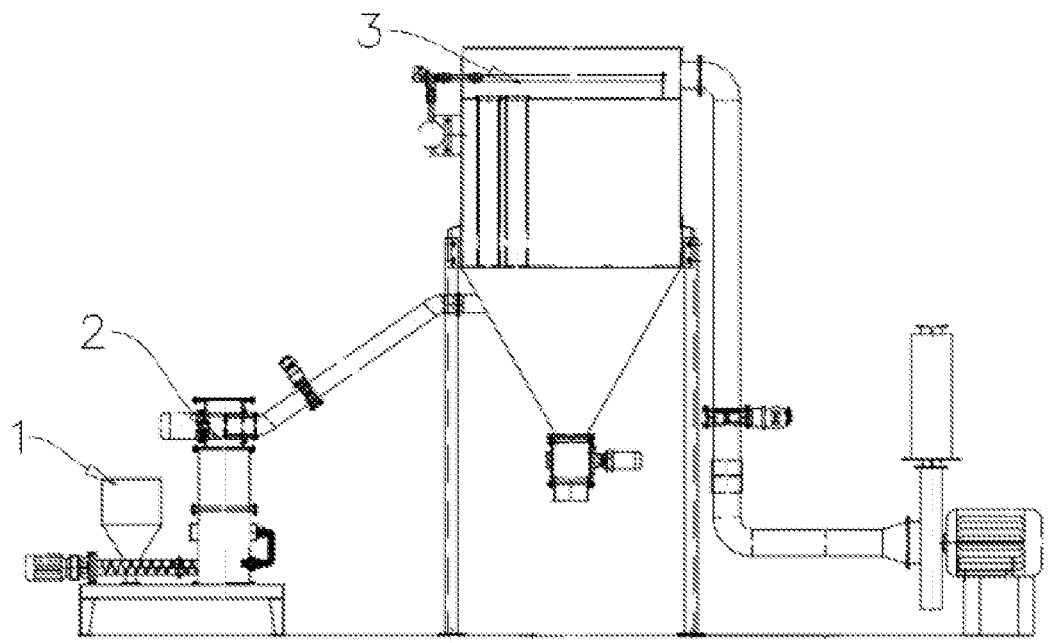
FIG. 1 is a front view of an airflow crushing equipment of the present application.
Figure 2:
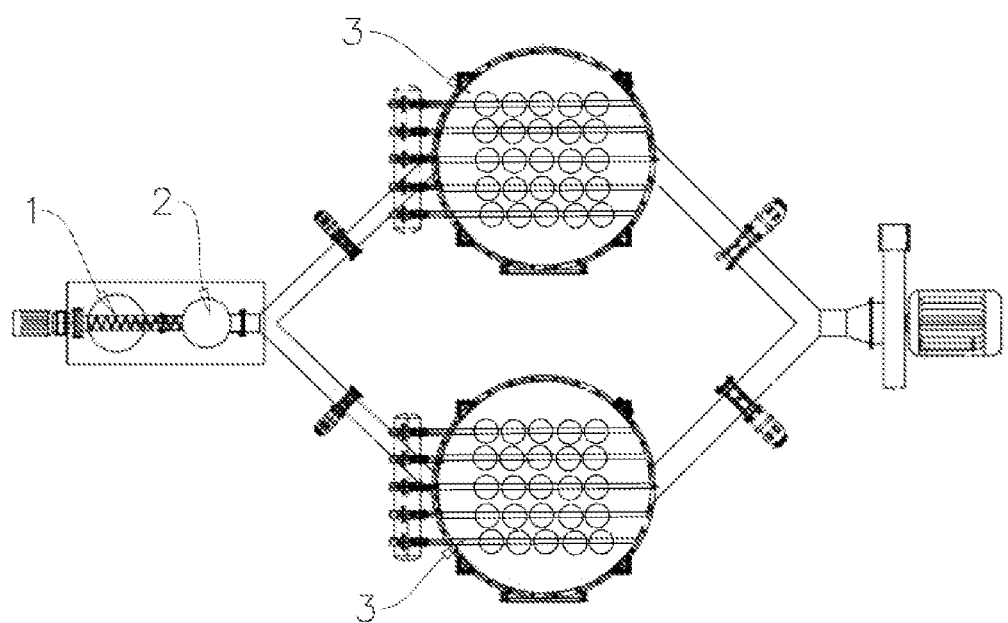
FIG. 2 is a top view of an airflow crushing equipment of the present application.

The present application will be further described in detail below in combination with FIGS. 1-2 and the examples.
Sources of a part of raw materials are as follows:
polylysine-PEG copolymer has an average molecular weight of 3400-10000, and is preferred as 5000 in the preparation examples; and an end group substitution rate is greater than or equal to 95%, and is 97.5% in examples;
mussel adhesive protein is YBDBF, with a content greater than or equal to 90%, available from Shanxi Lanyuan Biotechnology Co., Ltd;
chitosan has an average molecular weight of 10000-30000, and is preferred as 20000 in the preparation examples; and has a degree of deacetylation of 88%;
xanthan gum is SEFGTGHB, food grade, available from Shandong Xiyue Biotechnology Co., Ltd;
polyethylene glycol has an average molecular weight of 200-400, and is preferred as 200 in the preparation examples; and
PP has an average molecular weight of 30000-80000, and is preferred as 50000 in the application examples; and PP has a melt index of 16.0±3.0 g/10 min.

PREPARATION EXAMPLES OF SURFACE MODIFIER

Preparation Example 1

A preparation method for the surface modifier included the following steps:
step (1), weighting 0.2 kg of chitosan and dissolving the chitosan in 1 kg of organic acid solution, and heating to 75° C. under stirring for 2 h to obtain a mixture A;
step (2), weighting 0.01 kg of ammonium persulfate, adding the ammonium persulfate into the mixture A obtained in step (1) under uniformly stirring, and adding 1 kg of polyethylene glycol solution with a mass fraction of 8%, and stirring at a stirring speed of 100 r/min for 2 h to obtain a mixture B; and
step (3) weighting 0.1 kg of mussel adhesive protein solution, 0.1 kg of xanthan gum solution and 0.01 kg of polylysine-PEG copolymer, adding the 0.1 kg of mussel adhesive protein solution, 0.1 kg of xanthan gum solution and 0.01 kg of polylysine-PEG copolymer into the mixture B obtained in step (2), stirring at a stirring speed of 100 r/min for 0.8 h, and adding sodium hydroxide to adjust pH to 5.5 to obtain the surface modifier.

Xanthan gum solution was prepared by dissolving 0.08 kg of xanthan gum into 0.5 kg of deionized water.

Mussel adhesive protein solution was prepared by dissolving 0.1 kg of mussel adhesive protein into 0.5 kg of water.

Organic acid solution was prepared by uniformly dissolving citric acid, tartaric acid, salicylic acid and water in a weight ratio (kg) of 0.5:0.2:0.3:10.

Preparation Examples 2-3

Preparation examples 2-3 were same as Preparation example 1 except that, the raw materials had different usages, as shown in table 1.

TABLE 1

Usage (kg) of raw materials of Preparation examples 1-3

| Raw materials | Preparation example 1 | Preparation example 2 | Preparation example 3 |
| --- | --- | --- | --- |
| Organic acid solution | 1 | 1.6 | 2.2 |
| Chitosan | 0.2 | 0.4 | 0.5 |
| Polylysine-PEG copolymer | 0.01 | 0.02 | 0.03 |
| Ammonium persulfate | 0.001 | 0.003 | 0.005 |
| Xanthan gum solution | 0.1 | 0.2 | 0.3 |
| Mussel adhesive protein solution | 0.1 | 0.2 | 0.3 |
| Polyethylene glycol solution with a mass fraction of 8% | 1 | 1.5 | 2.0 |

PREPARATION COMPARATIVE EXAMPLES

Preparation Comparative Example 1

Preparation comparative example 1 was same as Preparation example 1 except that, the xanthan gum solution and the polylysine-PEG copolymer were replaced by equivalent amount of mussel adhesive protein solution.

Preparation Comparative Example 2

Preparation comparative example 2 was same as Preparation example 1 except that, the mussel adhesive protein solution was replaced by the xanthan gum solution.

Preparation Comparative Example 3

Preparation comparative example 3 was same as Preparation example 1 except that, there was no step (2), and the specific process was that:
step (1), weighting 0.2 kg of chitosan and dissolving the chitosan in 1 kg of organic acid solution, and heating to 75° C. under stirring for 2 h to obtain a mixture A; and
step (2) weighting 0.1 kg of mussel adhesive protein solution, 0.1 kg of xanthan gum solution and 0.01 kg of polylysine-PEG copolymer, adding the 0.1 kg of mussel adhesive protein solution, 0.1 kg of xanthan gum solution and 0.01 kg of polylysine-PEG copolymer into the mixture A obtained in step (1), stirring at a stirring speed of 100 r/min for 0.8 h, and adding sodium hydroxide to adjust pH to 5.5 to obtain the surface modifier.

Preparation Comparative Example 4

Preparation comparative example 4 was same as Preparation example 1 except that, there was no step (3), and the specific process was that:
step (1), weighting 0.2 kg of chitosan and dissolving the chitosan in 1 kg of organic acid solution, and heating to 75° C. under stirring for 2 h to obtain a mixture A; and
step (2), weighting 0.01 kg of ammonium persulfate, adding the ammonium persulfate into the mixture A obtained in step (1) under uniformly stirring, adding 1 kg of polyethylene glycol solution with a mass fraction of 8%, and stirring at a stirring speed of 100 r/min for 2 h, and adding sodium hydroxide to adjust pH to 5.5 to obtain the surface modifier.

Preparation Comparative Example 5

Preparation comparative example 5 was same as Preparation example 1 except that, there was no organic acid solution, and the specific process was that:
step (1), weighting 1 kg of polyethylene glycol solution with a mass fraction of 8%, 0.2 kg of chitosan and 0.001 kg of ammonium persulfate, and heating to 75° C. under stirring at a stirring speed of 100 r/min for 2 h to obtain a mixture B; and
step (2), weighting 0.1 kg of mussel adhesive protein solution, 0.1 kg of xanthan gum solution and 0.01 kg of polylysine-PEG copolymer, adding the 0.1 kg of mussel adhesive protein solution, 0.1 kg of xanthan gum solution and 0.01 kg of polylysine-PEG copolymer into the mixture B obtained in step (1), stirring at a stirring speed of 100 r/min for 0.8 h, and adding sodium hydroxide to adjust pH to 5.5 to obtain the surface modifier.

EXAMPLES

Example 1

A modified nano-zinc oxide powder is provided, and the modified nano-zinc oxide powder had a particle size of 10-90 nm.
The modified nano-zinc oxide powder was prepared by the following method:
step 1) weighting and mixing 1.5 kg of anhydrous ethanol, 0.5 kg of betaine and 2.5 kg of water uniformly to obtain a first active liquid; immersing 2 kg of raw material zinc oxide with a particle size of 0.1 mm totally into the first active liquid under stirring at a stirring speed of 100 r/min for 10 min, filtering and spreading a filter residue on a culture dish, and drying in an oven of 50° C. for 5 h to obtain an activated zinc oxide;
step 2) putting the activated zinc oxide into an airflow crushing equipment, successively feeding, extruding, adding pressure to the activated zinc oxide, injecting air to break agglomeration to obtain powders, screening the powders in a screening machine, collecting qualified powders, performing an airflow crushing to the unqualified powders under a work pressure of 1.0 MPa and an air demand of 2-4 $m^3$/min, and collecting zinc oxide with a particle size of 1-10 μm to obtain a crushed zinc oxide;
step 3) weighting and mixing 1.5 kg of anhydrous ethanol, 0.002 kg of dodecylphenol polyoxyethylene ether and 2 kg of water uniformly, adding 2-hydroxysuccinic acid to adjust pH to 5-6 to obtain a second active liquid; immersing the crushed zinc oxide of step 2) into the second active liquid under stirring at a stirring speed of 100 r/min for 10 min, filtering and spreading a filter residue on a culture dish, and drying in an oven of 50° C. for 5 h, and grinding in an grinding machine to obtain an activated nano-zinc oxide with a particle size of 20-50 nm; and
step 4) mixing the activated nano-zinc oxide and surface modifier in a weight ratio of 1:0.8 uniformly, and drying in an oven of 50° C. for 6 h, and grinding in the grinding machine to obtain a modified nano-zinc oxide powder with a particle size of 10-90 nm.

In particular, an airflow crushing equipment was used in step 2), and the airflow crushing equipment includes a feeding system 1, an airflow crushing grading machine 2 and a bag collector 3, arranged in sequence, in accordance with a processing process. The airflow crushing equipment further includes a material controller; and the feeding system 1, the airflow crushing classifier 2 and the bag collector 3 were electrically connected to the material controller. The activated zinc oxide was successively fed, extruded, added pressure, flowed, collided, crushed, screened and collected under the control of the material controller, such that the activated zinc oxide can be crushed under a low temperature, and the crushed zinc oxide had a uniform particle size and high purity.

Examples 2-8

Examples 2-8 were same as the Example 1 expect that, the surface modifiers have different sources, as shown in table 2.

TABLE 2

Sources of the surface modifiers of Examples 1-8

| Examples | Sources of the surface modifier |
| --- | --- |
| Example 1 | Preparation example 1 |
| Example 2 | Preparation example 2 |
| Example 3 | Preparation example 3 |
| Example 4 | Preparation comparative example 1 |
| Example 5 | Preparation comparative example 2 |
| Example 6 | Preparation comparative example 3 |
| Example 7 | Preparation comparative example 4 |
| Example 8 | Preparation comparative example 5 |

COMPARATIVE EXAMPLES

Comparative Example 1

Comparative example 1 was same as Example 1 except that, there was no step 1) of Example 1. Process of step 1) of Comparative example 1 was that, putting zinc oxide into an airflow crushing equipment, successively feeding, extruding, adding pressure to the zinc oxide, injecting air to break agglomeration to obtain powders, screening the powders in a screening machine, collecting qualified powders, performing an airflow crushing to the unqualified powders under a work pressure of 1.0 MPa and an air demand of 3 m$^3$/min, and collecting zinc oxide with a particle size of 1-10 μm to obtain a crushed zinc oxide. The other steps were same as that of Example 1.

Comparative Example 2

Comparative example 2 was same as Example 1 except that, there was no step 3) of Example 1. Process of step 3) of Comparative Example 2 was that, uniformly mixing the crushed zinc oxide and a surface modifier in a weight ratio of 1:0.8, and drying in an oven of 50 °C for 6 h, and grinding in a grinding machine to obtain a modified nano-zinc oxide powder with a particle size of 10-90 nm. The other steps were same as that of Example 1.

Comparative Example 3

Comparative example 3 was same as Example 1 except that, there were no step 1) and step 3) of Example 1. Process of Comparative Example 3 was that,
step 1) successively feeding, extruding, adding pressure to zinc oxide, injecting air to break agglomeration to obtain powders, screening the powders in a screening machine, collecting qualified powders, performing an airflow crushing to the unqualified powders under a work pressure of 1.0 MPa and an air demand of 3 m$^3$/min, and collecting zinc oxide with a particle size of 1-10 μm to obtain a crushed zinc oxide; and
step 2) mixing the crushed zinc oxide and surface modifier in a weight ratio (kg) of 1:0.8 uniformly, and drying in an oven of 50° C. for 6 h, and grinding in a grinding machine to obtain a modified nano-zinc oxide powder with a particle size of 10-90 nm.

Comparative Example 4

Comparative example 4 was same as Example 1 except that, a first active liquid in step 1) was changed with a second active liquid in step 3).

Comparative Example 5

Comparative example 5 was same as Example 1 except that, the surface modifier was replaced by an equivalent amount of surface modifier containing silane coupling agent, which was obtained by uniformly mixing KH550 and water in a weight ratio of 1:40.

APPLICATION EXAMPLES

Application Example 1

0.5 kg of the modified nano-zinc oxide powder obtained in Example 1 was weighted, and mixed with 10 kg of PP uniformly to obtain a mixture, the mixture was extruded in an extruder and granulated, to obtain particles, putting the obtained particles into an injection molding machine for injection molding to obtain a test sample.

Application Examples 2-13

Application examples 2-13 were same as Example 1 except that, the modified nano-zinc oxide powder had different sources, as shown in table 3.

TABLE 3

Sources of the modified nano-zinc oxide powders of Application examples 2-13

| Application examples | Sources of the modified nano-zinc oxide powders |
| --- | --- |
| Application example 1 | Example 1 |
| Application example 2 | Example 2 |
| Application example 3 | Example 3 |
| Application example 4 | Example 4 |
| Application example 5 | Example 5 |
| Application example 6 | Example 6 |
| Application example 7 | Example 7 |
| Application example 8 | Example 8 |
| Application example 9 | Comparative example 1 |
| Application example 10 | Comparative example 2 |
| Application example 11 | Comparative example 3 |
| Application example 12 | Comparative example 4 |
| Application example 13 | Comparative example 5 |

Performance Test

The test samples obtained from Application examples 1-13 were tested in accordance with the following performance tests, as shown in table 4.
Detection Method/Test Method
1. Antibacterial Property The test samples were conducted an antibacterial effect test with an oscillating contact time of 24 h in accordance with ASTME2149-2013a. Test strain was Methicillin resistant *Staphylococcus aureus* ATCC33591. Bacterial count (CFU/mL) was obtained after elution at different contact times, in which the control group is performed for a test sample that did not contain the modified nano-zinc oxide powder of the present application.
2. Ultraviolet-Aging Resistance Test The test samples obtained from Application examples were tested in an Ultraviolet-aging test chamber in accordance with ASTMG154-00A. Specifically, the test samples were fixed on a test rack and faced to a fluorescent lamp. When the sample holder was not fully filled with test samples, the sample holder needed to be filled with a blackboard to keep an inner wall of the Ultraviolet-aging test chamber closed.

A illumination temperature was 60 °C, and a temperature of condensation section was 50° C. The cycle of illumination and condensation was a cycle of 4H illumination and 4H condensation. After the test were performed for 80 h, the test samples were taken out and stood for 2 h and be tested for tensile strength, and the tensile strength data was defined as L1.

The test samples obtained from Application examples 1-13 which were not subjected to Ultraviolet-aging test were tested for tensile strength after placed at normal temperature and normal pressure and a humidity of 50% for 80 h in accordance with GB/T1040.1-2018, and the test data were defined as L2. Ultraviolet-aging rate=[(L2−L1)/L2]*100%, and the higher the Ultraviolet-aging rate, the poorer the Ultraviolet-aging resistant effect, conversely, the lower the Ultraviolet-aging rate, the better the Ultraviolet-aging resistant effect, as shown in Table 4.

TABLE 4

Test data of Application examples 1-13

| Test items | Bacterial count (CFU/mL) obtained after elution at different contact times | | Ultraviolet-aging rate (%) | Tensile strength (MPa) |
|---|---|---|---|---|
| | Contact for 0 h | Contact for 24 h | | |
| Control group | $2.1 * 10^5$ | $5.0 * 10^5$ | \ | \ |
| Application example 1 | / | $0.26 * 10^0$ | 1.37 | 35.68 |
| Application example 2 | / | $0.13 * 10^0$ | 1.01 | 36.29 |
| Application example 3 | / | $0.18 * 10^0$ | 1.13 | 37.12 |
| Application example 4 | / | $0.58 * 10^0$ | 1.46 | 31.12 |
| Application example 5 | / | $0.63 * 10^0$ | 1.63 | 28.13 |
| Application example 6 | / | $0.65 * 10^0$ | 2.33 | 28.58 |
| Application example 7 | / | $0.56 * 10^0$ | 2.07 | 27.64 |
| Application example 8 | / | $0.71 * 10^0$ | 1.89 | 31.11 |
| Application example 9 | / | $1.69 * 10^0$ | 1.59 | 33.89 |
| Application example 10 | / | $1.78 * 10^0$ | 1.97 | 31.12 |
| Application example 11 | / | $2.61 * 10^0$ | 3.43 | 22.84 |
| Application example 12 | / | $2.12 * 10^0$ | 2.42 | 32.87 |
| Application example 13 | / | $10.21 * 10^0$ | 7.58 | 34.18 |

As can be seen from Application examples 1 and 9-11 and table 4 that, the bacterial count and Ultraviolet-aging rate of Application examples 9-11 are all higher than that of Application example 1, while the tensile strength of Application examples 9-11 are lower than that of Application example 1. As can be seen that, after being treated by the first active liquid and the second active liquid, the modified nano-zinc oxide powder has high purity, antibacterial property, compatibility and ultraviolet resistance, which also has good antibacterial property, ultraviolet resistance and tensile strength after being applied in food packaging material.

As can be seen from Application examples 1 and 12 and table 4 that, the bacterial count and Ultraviolet-aging rate of Application example 12 are higher than that of Application example 1, while the tensile strength of Application example 12 is lower than that of Application example 1. As can be seen that, the activity of zinc oxide is not good after the first active liquid is changed with the second active liquid.

As can be seen from Application examples 1 and 13 and table 4 that, the bacterial count and Ultraviolet-aging rate of Application example 13 are both higher than that of Application example 1, while the tensile strength of Application example 13 is close to that of Application example 1. It can be shown that, the silane coupling agent can improve the compatibility of the nano-zinc oxide, but its antibacterial property and ultraviolet resistance are worse than that of the modified nano zinc oxide powder prepared in the present application.

As can be seen from Application examples 1 and 4-5 that, the bacterial count and Ultraviolet-aging rate of Application examples 4-5 are higher than that of Application example 1, while the tensile strength of Application examples 4-5 is lower than that of Application example 1. As can be seen that, the mixing of xanthan gum solution, polylysine-PEG copolymer, and mussel adhesive protein solution in the present application has a good effect, thereby further enhancing the compatibility between the modified nano-zinc oxide powder and the polymer, and further improving the antibacterial property, ultraviolet resistance and physical property after being applied in the food packaging materials.

As can be seen from Application examples 1 and 6-8 that, the bacterial count and Ultraviolet-aging rate of Application examples 6-8 are higher than that of Application example 1, while the tensile strength of Application example 13 is lower than that of Application example 1. As can be seen that, the surface modifier obtained through the preparation method of the present application has a good modification effect and a good wrapping effect on the nano-zinc oxide, thereby enhancing the compatibility between the modified nano-zinc oxide powder and the polymer. When the modified nano-zinc oxide powder is applied in food packaging material, the food packaging materials have good antibacterial property, ultraviolet resistance and physical property.

The above are the preferred embodiments of the present application, which are not intended to limit the protection scope of the present application. Therefore, all equivalent changes made according to the structure, shape and principle of the present application should be covered within the protection scope of the present application.

LIST OF REFERENCE MARKS 1. feeding system;
2. airflow crushing grading machine; and
3. bag collector.

What is claimed is:

1. A preparation method for a modified nano-zinc oxide powder, comprising the following steps:
   step 1) weighing and mixing 15-30 parts of anhydrous ethanol, 0.5-3 parts of betaine and 10-20 parts of water uniformly, calculated in parts by weight, to obtain a first active liquid; immersing a zinc oxide into the first active liquid, filtering and drying to obtain an activated zinc oxide;
   step 2) crushing the activated zinc oxide by airflow crushing to obtain a crushed zinc oxide;
   step 3) weighing and mixing 10-20 parts of the anhydrous ethanol, 0.01-0.05 parts of dodecylphenol polyoxyethylene ether and 10-30 parts of the water uniformly, calculated in parts by weight, adding 2-hydroxysuccinic acid to adjust pH to 5-6 to obtain a second active liquid; immersing the crushed zinc oxide into the second active liquid, filtering, drying and grinding to obtain an activated nano-zinc oxide; and step 4) mixing the activated nano-zinc oxide and a surface modifier in a weight ratio of 1:(0.8-1.5) uniformly, drying and grinding to obtain the modified nano-zinc oxide powder with a particle size of 10-90 nm.

2. The preparation method for the modified nano-zinc oxide powder according to claim 1, wherein the crushed zinc oxide has a particle size of 1-10 μm.

3. The preparation method for the modified nano-zinc oxide powder according to claim 1, wherein the activated nano-zinc oxide has a particle size of 5-50 nm.

4. The preparation method for the modified nano-zinc oxide powder according to claim 1, wherein the zinc oxide has a particle size of 0.1-1 mm.

5. The preparation method for the modified nano-zinc oxide powder according to claim 1, wherein an airflow crushing equipment is used in the step 2), and the airflow crushing equipment comprises a feeding system, an airflow crushing grading machine and a bag collector, arranged in sequence.

6. The preparation method for the modified nano-zinc oxide powder according to claim 1, wherein the surface modifier is made of the following raw-materials in parts by weight:
- 0.1-0.3 parts of polylysine-polyethylene glycol (PEG) copolymer;
- 10-20 parts of polyethylene glycol solution;
- 10-22 parts of organic acid solution;
- 1-3 parts of mussel adhesive protein solution;
- 1-3 parts of xanthan gum solution;
- 0.01-0.05 parts of ammonium persulfate; and
- 2-5 parts of chitosan.

7. The preparation method for the modified nano-zinc oxide powder according to claim 6, wherein the organic acid solution comprises citric acid, tartaric acid, salicylic acid and water.

8. The preparation method for the modified nano-zinc oxide powder according to claim 7, wherein the citric acid, the tartaric acid, the salicylic acid and the water are in a weight ratio of (0.5-0.8):(0.2-0.5):(0.1-0.3):10.

9. The preparation method for the modified nano-zinc oxide powder according to claim 6, wherein a preparation method for the surface modifier comprises the following steps:
step (a) weighing the chitosan and dissolving the chitosan in the organic acid solution, heating to 65-85° C., and stirring for 1-3 h to obtain a mixture A;
step (b) weighing the ammonium persulfate, adding the ammonium persulfate into the mixture A while uniformly stirring, adding the polyethylene glycol solution, and stirring for 1-3 h to obtain a mixture B; and
step (c) weighing the xanthan gum solution, the mussel adhesive protein solution and the polylysine-PEG copolymer, adding the xanthan gum solution, the mussel adhesive protein solution and the polylysine-PEG copolymer into the mixture B, stirring for 0.5-1 h, and adjusting pH to 4.5-5.5 to obtain the surface modifier.

* * * * *